United States Patent [19]

Pamer

[11] 4,293,256

[45] Oct. 6, 1981

[54] LOAD INDICATING FASTENER

[75] Inventor: Walter R. Pamer, Parma, Ohio

[73] Assignee: The Lamson & Sessions Co., Cleveland, Ohio

[21] Appl. No.: 92,648

[22] Filed: Nov. 9, 1979

[51] Int. Cl.³ .............................................. F16B 31/02
[52] U.S. Cl. ...................................... 411/11; 411/186; 411/137; F16B/39/26
[58] Field of Search ...................... 85/62, 9 R; 151/38, 151/37, 35; 411/186, 187, 154, 163, 11, 10

[56] References Cited

U.S. PATENT DOCUMENTS

| 179,931 | 7/1876 | Loomis | 151/38 |
|---|---|---|---|
| 1,875,930 | 9/1932 | Martin | 151/38 |
| 1,956,745 | 5/1934 | Payne | 151/37 |
| 2,179,575 | 11/1939 | Hosking | 151/35 |
| 2,226,491 | 12/1940 | Gustafson | 151/37 |
| 2,943,528 | 7/1960 | Curry | 85/62 |
| 3,030,996 | 4/1962 | Doerr | 85/62 X |
| 3,056,443 | 10/1962 | Knocke | 151/38 |
| 3,077,218 | 2/1963 | Ziegler | 151/35 |
| 3,343,580 | 9/1967 | Coldren | 151/37 |
| 3,390,713 | 7/1968 | Gutshall | 151/35 |
| 3,877,339 | 4/1975 | Muenchinger | 151/38 X |
| 4,020,734 | 5/1977 | Bell | 411/10 |
| 4,149,446 | 4/1979 | Spengler et al. | 411/11 |

FOREIGN PATENT DOCUMENTS

| 586689 | 11/1959 | Canada | 151/38 |
|---|---|---|---|
| 1079711 | 4/1960 | Fed. Rep. of Germany | 151/38 |
| 974936 | 6/1961 | Fed. Rep. of Germany | . |
| 2226161 | 5/1972 | Fed. Rep. of Germany | . |
| 1143398 | 7/1965 | United Kingdom | . |
| 1314277 | 4/1973 | United Kingdom | 151/37 |
| 1476920 | 4/1973 | United Kingdom | . |
| 1441499 | 10/1974 | United Kingdom | . |

Primary Examiner—Ramon S. Britts
Attorney, Agent, or Firm—Yount & Tarolli

[57] ABSTRACT

An improved fastener indicates when a predetermined preload has been applied to the fastener. The fastener includes a body section which is connected with a thread convolution. A load transmitting and indicating section is connected with the body section. The load transmitting and indicating section includes a bearing section having a flat annular bottom surface and an undulating annular spring section which circumscribes the bearing section. The spring section has a bottom surface with crest and trough portions. The crest portions extend tangentially to the plane of the bottom surface of the bearing section. The trough portions are resiliently deflectable toward the body section to flatten the undulations in the spring section upon application of the predetermined preload to the fastener. The spring section is resiliently returnable toward an initial configuration to increase the amplitude of the undulations in the spring section to provide a visual indication that the connection between the fastener and a member is loosening.

21 Claims, 12 Drawing Figures

LOAD INDICATING FASTENER

BACKGROUND OF THE INVENTION

An improved load indicating fastener is utilized to indicate when a predetermined preload has been applied to the fastener to thereby apply a force against a member and to indicate when the force against the member is reduced.

When a fastener, such as a nut or bolt, is subjected to a varying load, fatigue failure tends to occur. The endurance strength and fatigue life of a fastener are greatly enhanced by application of a precise preload to the fastener. Although torque measuring devices, such as torque wrenches, have been used to measure the extent of the preload applied to a fastener, this method of determining preload is inaccurate due to variations in the coefficient of friction between mating surfaces of a fastener. It has been estimated that the preload applied to a fastener will vary by plus or minus 30% when torque is used as a measure of preload.

Washers have been associated with fasteners to provide a visual indication when a predetermined clamping force is applied against the washer. The use of these load indicating washers provides an indication of when a desired preload has been applied to a fastener. Known load indicating washers are disclosed in U.S. Pat. Nos. 3,948,141; 3,306,154; and 3,304,827.

In addition to the aforementioned load indicating washers, there are known washers having retaining elements to hold the washer against rotation relative to a fastener and/or a member against which the washer is pressed by the fastener. At least some of these washers have waves or undulations. When the undulating washers are pressed against the member, the undulations tend to be flattened and the retaining elements are forced into engagement with the member. Some of these known washers are disclosed in U.S. Pat. Nos. 3,390,713; 3,077,218; 2,179,575; and 2,069,402.

Fasteners having drive sections with built-in washers or flanges are also known. At least some of these flanges have a wave or undulating configuration. In addition, retaining elements have been associated with some of the flanges. Prior art fasteners having flanges are disclosed in U.S. Pat. Nos. 3,877,339; 3,343,580; 3,056,443; 1,956,745; and 1,875,930.

SUMMARY OF THE PRESENT INVENTION

The present invention provides a new and improved load indicating fastener which indicates when a predetermined preload has been applied to the fastener. The fastener also indicates when the predetermined preload is reduced.

The load indicating fastener includes a body section which is connected to and disposed in a coaxial relationship with a thread convolution. A load transmitting and indicating section is connected with the body section. When a predetermined preload is applied to the fastener, undulations or waves in the load transmitting and indicating section are flattened by the force applied against a member. This provides a visual indication that the desired preload has been applied to the fastener. If the fastener should subsequently become loose, the flattened undulations expand and return toward their initial configurations to provide a readily detected visual indication of loosening of the fastener.

The load transmitting and indicating section of the fastener includes a bearing section having a flat bottom surface which abuttingly engages the member to apply a clamping force against the member when the fastener is tightened with the desired preload. In addition, the load transmitting and indicating section includes an undulating spring section which circumscribes the bearing section. The spring section has a bottom surface with crest and trough portions. The crest portions of the spring section extend tangentially to the plane of the flat bottom surface of the bearing section. The trough portions slope radially and axially outwardly from the bearing section and are engageable with the member to flatten the undulations in the spring section under the influence of forces applied against the trough portions upon the application of the predetermined preload to the fastener. The spring section is resiliently returnable to increase the amplitude of the trough portions upon a reduction of the force applied to the trough portions by the member to provide a visual indication of loosening of the fastener. A fastener constructed in accordance with the present invention can be either a nut or a bolt and can be preloaded in many different ways.

Accordingly, it is an object of this invention to provide a new and improved load indicating fastener for indicating when a predetermined preload has been applied to the fastener and for indicating when a loosening of the fastener occurs.

Another object of this invention is to provide a new and improved load indicating fastener having a bearing section with a flat bottom surface and a spring section with an undulating bottom surface having crest portions which extend tangentially to the plane of the bottom surface of the bearing section throughout the extent of the crest portions and having trough portions which slope outwardly from the bearing section.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

Figure 1:
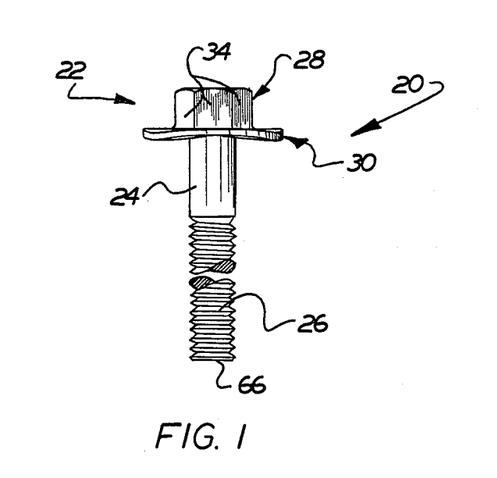
FIG. 1 is an elevational view of a load indicating fastener, that is a bolt, constructed in accordance with the present invention.
Figure 2:
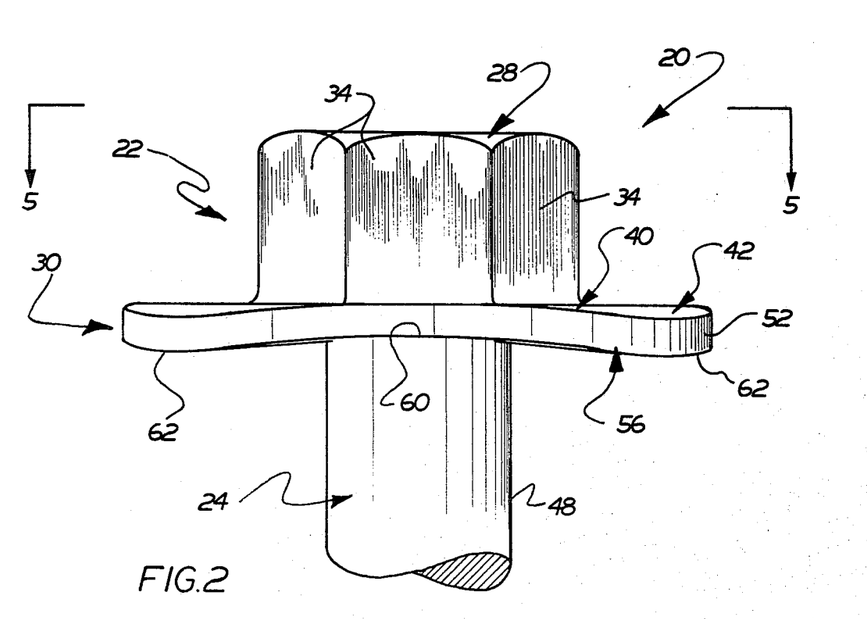
FIG. 2 is an enlarged illustration of the head end portion of the bolt of FIG. 1.

In the embodiment of the invention illustrated in FIG. 1, the load indicating fastener 20 is a metal bolt having a head end 22 which is integrally formed with a cylindrical shank 24. An external thread convolution 26 is formed on the shank 24. The head end 22 includes a drive or body section 28 which is coaxial with the cylindrical shank 24 and thread convolution 26. The head end 22 also includes a load transmitting and indicating section 30 which is coaxial with the shank 24.

In the illustrated embodiment of the invention, the drive or body section 28 has six flat side surfaces 34 which are disposed in a hexagonal array (FIG. 5) and are adapted to be engaged by a wrench or other tool to tighten the fastener. Although the body secton 28 has been illustrated as having flat side surfaces, it is contemplated that the body section could have other constructions. Thus, the body section 28 could have a generally cylindrical configuration and could be provided with either a slot or a socket which would be engaged by a tool to tighten the fastener. If desired, the body section could have a rounded, imperforate configuration such as is commonly found on a carriage bolt.

The load transmitting and indicating section 30 is integrally formed with the body section 28 and includes a bearing section 40 and a spring section 42 (FIGS. 2-5). The annular spring section 42 circumscribes the bearing section 40 and is disposed in a coaxial relationship with the thread convolution 26, shank 24, and the bearing section. The bearing section 40 has a flat annular bottom surface 46 (FIG. 3) which extends radially outwardly from a cylindrical side surface 48 of the shank 24. Thus, the bearing surface 46 has an inside diameter which is equal to the outside diameter of the shank 48 and/or the nominal diameter of the thread convolution 26.

Figure 5:
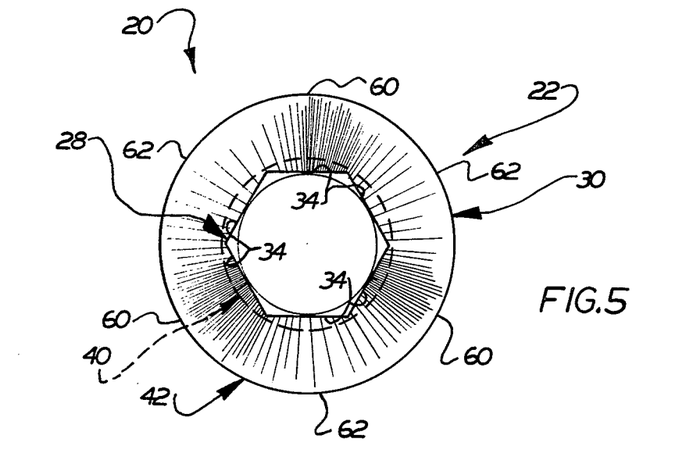
FIG. 5 is a top plan view, taken on a reduced scale along the line 5—5 of FIG. 2, illustrating the relationship between the spring and bearing sections and a body section of the bolt.

In order to provide a firm clamping action against a member, the annular bearing surface 46 has an outside diameter which is substantially the same as the diameter of a circle which circumscribes and intersects the corners of the hexagonal array of side surfaces 34 (see FIG. 5). Although the bearing section 40 has been illustrated in FIG. 5 as having a diameter which is slightly greater than the diameter of a circle which circumscribes and intersects the corners of the hexagonal array of side surface 34, it is contemplated that the annular bearing surface 46 could have an outside diameter which is slightly smaller than the diameter of the circle which circumscribes the corners of the hexagonal array of side surfaces 34 on the body or drive section 28. Thus, the flat annular bearing surface 46 has an outside diameter equal to between 1.3 and 2.0 times the diameter of the shank 48 and/or the nominal diameter of the thread convolution 26. The distance between diametrically opposite corners of the hexagonal array of flat side surfaces 34 on the body section 28 is a maximum of 1.6 times the diameter of the shank 48. In the illustrated embodiment of the invention, the diameter of the shank 48 is equal to the nominal diameter of the thread convolution 26.

The spring section 42 has a circular undulating rim 52 which is disposed in a coaxial relationship with the shank 24 and the drive section 28. In addition, the spring section 42 has an undulating annular bottom surface 56 which is disposed radially outwardly of the flat annular bearing surface 46. The bottom surface 56 has upwardly curving crest portions 60 (see FIG. 2) and downwardly curving trough portions 62. The crest and trough portions 60 and 62 of the bottom surface 56 form a continuously curving surface, that is a surface which is free of sharp discontinuities or intersecting surface planes in order to minimize stress concentrations in the spring section 42.

The trough portions 62 (see FIG. 3) of the surface 56 slope away from the annular bearing surface 46. Thus, the trough portions 62 extend radially outwardly from the bearing surface 46 and slope axially downwardly toward the leading end 66 of the bolt 20 (FIG. 1). Each trough portion 62 has a central axis which is disposed in a plane which contains the longitudinally central axis of the shank 24 and extends perpendicular to the flat annular bearing surface 46.

The crest portions 60 (see FIG. 4) of the surface 56 extend tangentially to the plane of the flat annular bearing surface 46. Thus, at the highest point on a crest portion 60, a radial line from the shank 24 in the plane of the flat bearing surface 46 will extend throughout the length of a crest portion 60. Although the trough portions 62 slope radially outwardly and axially downwardly (as viewed in FIG. 2), the crest portion 60 extends radially outwardly from the shank 24. Therefore the highest point on a crest portion 60 is located the same axial distance from a leading end surface 66 of the shank 24 as is the bearing surface 46. By having the crest portion 60 in the same radial plane as the bearing surface 46, the total load transmitting area tends to be maximized.

Although different numbers of undulations could be provided in the spring section 42 if desired, in the illustrated embodiment of the invention, there are three equally spaced crest portions 60 and three equally spaced trough portions 62 (see FIG. 5). The central axes of the crest and trough portions 60 and 62 are disposed along planes which contain the longitudinal central axis of the shank 24 and extend outwardly through the centers of the flat side surfaces 34 of the body or driving section 28. Thus in one specific preferred embodiment of the invention, the crest and trough portions 60 and 62 have central axes which are normally located midway between the corners of the hexagonal array of side surfaces 34. This results in the central axes of the crest and trough portions 60 and 62 extending perpendicular to the side surfaces 34 of the drive section 28. The central axes of the lower surfaces of the trough portions 62 extend at an angle of between 5 and 20 degrees to the central axes of the crest portions 60 with an angle of 10 degrees being preferred.

It is contemplated that the spring section 42 will cooperate with a member against which it is pressed to provide a locking action to hold the thread convolution 26 in firm abutting engagement with a mating internal thread convolution. In addition, it is contemplated that the spring section 42 will provide a visual indication when a predetermined preload has been applied to the fastener 20 to tighten it and to provide a visual indication if the fastener loosens with the passage of time. In addition, the spring section 42 distributes the clamping force between the fastener and the member over a relatively large area to prevent localized deformation of a member. In order to provide a relatively large area of engagement between the load transmitting and indicating section 30 and a member which is to be clampingly engaged by the fastener 20, the spring section 42 has an outside diameter which is 2.5 to 3.4 times the diameter of the shank 24 or the nominal diameter of the thread convolution 26.

Figure 6:
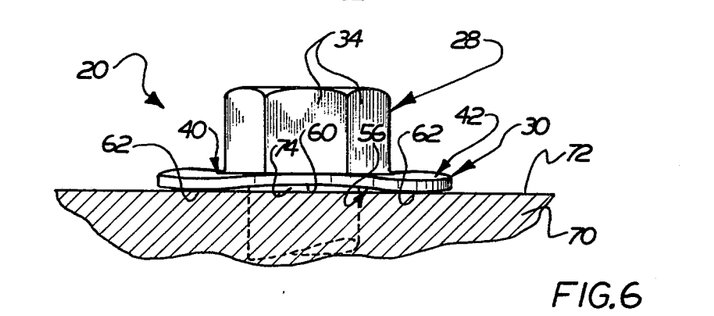
FIG. 6 is a fragmentary illustration depicting the relationship between the head end portion of the bolt of FIG. 1 and a member when the spring section is in loose engagement with the member.
Figure 7:
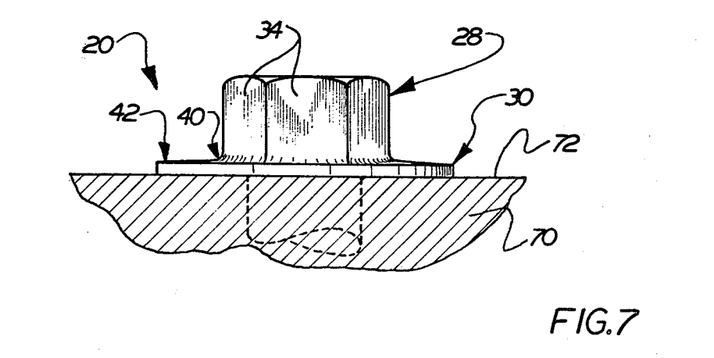
FIG. 7 is a fragmentary elevational view, generally similar to FIG. 6, illustrating the relationship between the spring section and the member when the fastener has been tightened with a predetermined preload.

When the fastener 20 is to be tightened against a member 70 (see FIG. 6), the trough portions 62 of the spring section 42 engage the outer side surface 72 of the member 70 when the fastener is positioned in loose engagement with the member 70. As the fastener is tightened the undulations in the spring section 42 are resiliently flattened. As this occurs, a space or gap 74 between the bottom surface 56 of the crest portions 60 and the upper surface 72 of the member 70 decreases. When a predetermined preload is applied to the fastener, the load transmitting and indicating section is fully flattened (see FIG. 7). At this time the spring section 42 and bearing surface 46 abuttingly engage the upper side surface 72 of the member 70. Although the preload is applied to the fastener 20 by tightening a nut (not shown), it is contemplated that the preload could be applied to the fastener in other ways if desired, such as through the body section 28.

Flattening of the spring section 42 provides a clear visual indication that the desired load has been applied to the fastener. Thus when a predetermined preload has been applied to the fastener 20, the gap or space 74 (see FIG. 6) between the crest portion 60 and the surface 72 of the member 70 disappears. If the fastener should subsequently loosen, a clear visual indication of the loosening of the fastener will be provided by a resilient expanding or returning of the fastener toward its initial configuration. This results in reestablishment of the gap or space 74.

The spring section 42 is sized so that the undulations in the spring section are flattened by the force transmitted between the upper surface 72 of the member 70 and the spring section when a desired preload has been applied to the fastener. The preload at which this occurs is, in part at least, determined by the thickness of the load transmitting and indicating section 30.

It has been determined that in order to obtain the desired spring action, the spring section 42 should have a thickness at the rim 52 so that the amplitude of waves, that is the axial distance between the top of a crest 60 and the bottom of a trough 62 formed in the bottom surface 56 of the spring section 42, is equal to between 0.5 and 1.5 times the thickness of the spring section 42 at the rim 52. In addition, the ratio of the thickness of the spring section 42 at the rim 52 to the radial width of the annular spring section as measured between the outer diameter of the bearing section 40 and the outer diameter or rim of the spring section 42 should be equal to between 0.10 and 0.35. The obtaining of the desired spring action is also promoted by the flat annular bearing surface 46 which provides a basis for a controlled distortion of the spring section 42.

It is preferred to have the load transmitting and indicating section 30 taper slightly. Therefore, a radially linear upper side surface area 78 (FIG. 4) of the crest portion 60 extends at an acute angle of 2 to 8 degrees relative to the radial plane of the bottom surface 46 of the bearing section 40. The top surface of the trough portion 62 is similarly tapered relative to the bottom surface of the trough portion. Therefore, at any given radial distance outwardly from the central axis of the shank 24, the spring section 42 has a uniform axial thickness about the circumference of the shank. However, the axial thickness of the spring section 42 decreases as the radial distance outwardly from the shank increases. This radially outwardly tapering configuration of the load transmitting and indicating section 30 results in the bearing section 40 having a greater stiffness than the spring section 42.

The annular upper side surface 80 of the spring section 42 is provided with undulations of the same magnitude as the undulations in the lower side surface 56 of the spring section. The undulations in the upper side surface 80 are in phase with the undulations in the lower side surface 56 so that the rim surface 52 has a uniform thickness around the spring section 42 at a given radial distance outwardly from the shank 24. Thus, the upper side surface 80 of the spring section 42 has troughs 84 (see FIG. 3) which are spaced upwardly from and are aligned with the troughs 62 in the bottom surface 56. Similarly, the spring section 42 has crests 86 (FIG. 4) which are axially aligned with the crest 60 in the bottom surface 56. Due to the tapered cross sectional configuration of the spring section 42, the upper side surface 80 extends transversely to the lower side surface 56 and to the bearing surface 46.

The amplitude of the crests and troughs in the top and bottom surfaces 56 and 80 of the spring section 42 are zero where the spring section 42 joins the bearing section 40. The amplitude of the crest and troughs in the spring section 42 increases as the radial distance from the bearing section 40 increases. Therefore, the crests and troughs 60 and 62 have their maximum amplitude at the rim 52 of the spring section 42 and a minimum or zero amplitude at the bearing section 40.

Figure 8:
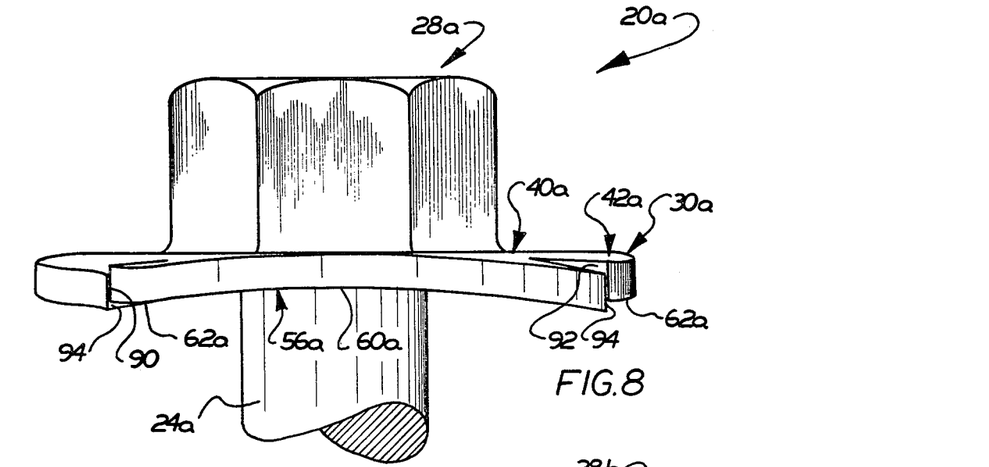
FIG. 8 is a fragmentary elevational view, generally similar to FIG. 2, illustrating a second embodiment of the invention in which the annular spring section is split to provide retainers to hold the fastener against rotation in a direction tending to loosen the fastener.

In the embodiment of the invention shown in FIGS. 1-7, the top and bottom surfaces 80 and 56 of the spring section 42 are continuously curving and are free of discontinuities. In the embodiments of the invention shown in FIGS. 8 and 9, discontinuities are provided in the spring section to form retainer elements which retard relative rotation between the fastener and the member 70. Since the embodiments of the invention shown in FIGS. 8 and 9 are generally similar to the embodiment of the invention shown in FIGS. 1-7, similar numerals will be utilized to designate similar components, the suffix letter "a" being associated with the embodiment of the invention shown in FIG. 8 and the suffix letter "b" being associated with the embodiment of the invention shown in FIG. 9 in order to avoid confusion.

A fastener 20a (FIG. 8) has a body or drive section 28a and a load transmitting and indicating section 30a which are connected in a coaxial relationship with a shank 24a and a thread convolution (not shown). In accordance with a feature of this embodiment of the invention, radially extending splits 90 and 92 are formed in the spring section 42a and extend inwardly to the outer diameter of the base section 40a. The splits 90 and 92 are formed at the center or lowermost portion of the troughs 62a in the bottom surface 56a of the spring section 42a. A portion of the bottom surface 56a which forms crest 60a is continuously curving and is free of discontinuities.

The spring section 42a is offset at the splits 90 and 92 to provide an axially downwardly projecting portion 94 which will tend to dig into the member 70 when the fastener 20a is rotated in a direction tending to loosen the fastener. Of course, when the fastener is rotated in the opposite direction, the projecting portions 94 will slide or move smoothly over the surface 72 of the member 70 without gouging the surface.

Figure 9:
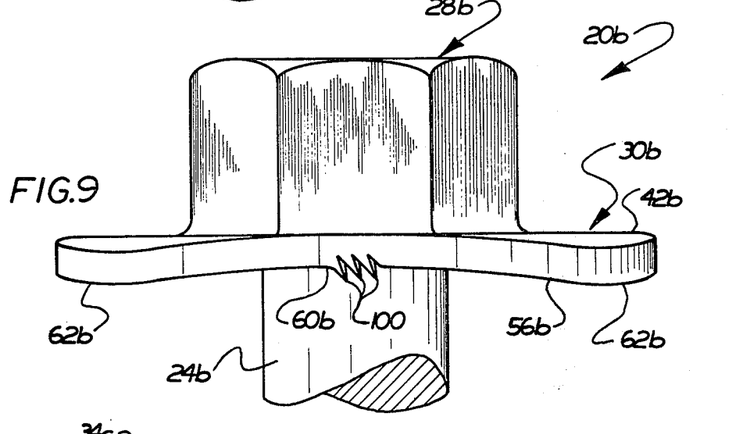
FIG. 9 is a fragmentary illustration, generally similar to FIG. 8, of another embodiment of the invention in which retaining teeth are formed on the spring section to hold the fastener against rotation relative to a member.

In the embodiment of the invention illustrated in FIG. 9, the fastener 20b has a body or drive section 28b and a load transmitting and indicating section 30b which are connected in a coaxial relationship with an externally threaded shank 28b. In this embodiment of the invention, a spring section 42b is provided with axially downwardly projecting teeth 100 formed in the lower surface 56b at a crest portion 60b of the spring section.

When the fastener 28b loosely engages a member 70 (in the manner shown in FIG. 6 for the fastener 20b), the downwardly projecting teeth 100 are disposed above the surface 72 of the member. As the fastener is tightened, the undulations in the spring section 42b are flattened and the teeth 100 move into engagement with the upper surface 72 of the member 70.

The teeth 100 extend axially downwardly and toward the right (as viewed in FIG. 9) so that as the fastener 20b is turned in a direction tending to tighten the connection with the member 70b, the teeth will cam or slide along the upper surface 72 without gouging the surface. However, upon the application of a rotational action to the fastener 20b tending to loosen the fastener, the pointed teeth will dig into the surface 70 and hold the fastener 20b against rotation relative to the member 70. Although the teeth 100 are provided in the crest portion 60b of the spring section 42b, the trough portions 62b are defined by continuously curving surface areas which are free of discontinuities.

Although only one set of teeth 100 has been shown in FIG. 9, it is contemplated that other sets of teeth could be provided at each of the three crest portions of the spring section 42b. Similarly, splits could be provided at the three trough portions 62a of the fastener 20a of FIG. 8.

Figure 10:
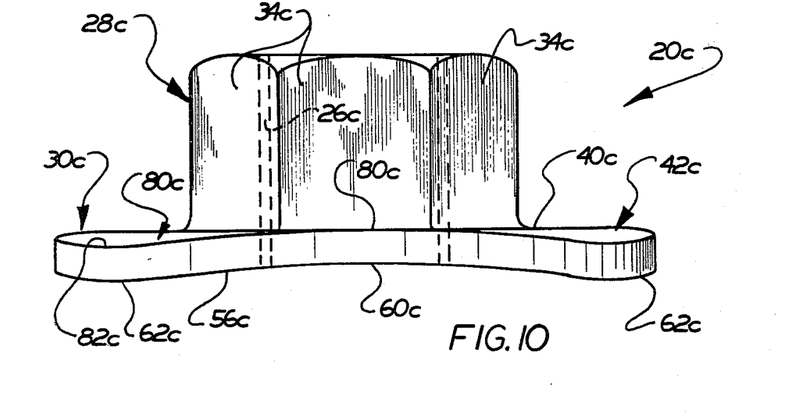
FIG. 10 is an illustration of an embodiment of the invention in which the load indicating fastener is a nut.

In the embodiments of the invention illustrated in FIGS. 1-9, the fasteners 20, 20a and 20b are bolts having external thread convolutions formed on the axially extending shanks 28, 28a and 28b. However, it is contemplated that the present invention will be utilized with nuts or internally threaded members. Accordingly, the embodiment of the invention shown in FIG. 10 is an internally threaded member. Since the embodiment of the invention shown in FIG. 10 is generally similar to the embodiment of the invention shown in FIGS. 1-9, similar numerals will be utilized to designate similar components, the suffix letter "c" being associated with FIG. 10 in order to avoid confusion.

The fastener 20c includes a body or drive section 28c which is coaxial with a load transmitting and indicating section 30c. An internal thread convolution 26c extends axially through an opening formed in the body section 28c and load transmitting and indicating section 30c. The load transmitting and indicating section 30c includes a bearing section 40c and a spring section 42c. The body section 28c has flat side surfaces 34c arranged in a hexagonal array. The distance between diametrically opposite corners of the hexagonal array of flat side surfaces 34c is a maximum of 1.8 times the nominal diamter of the internal thread convolution 26c.

Figure 3:
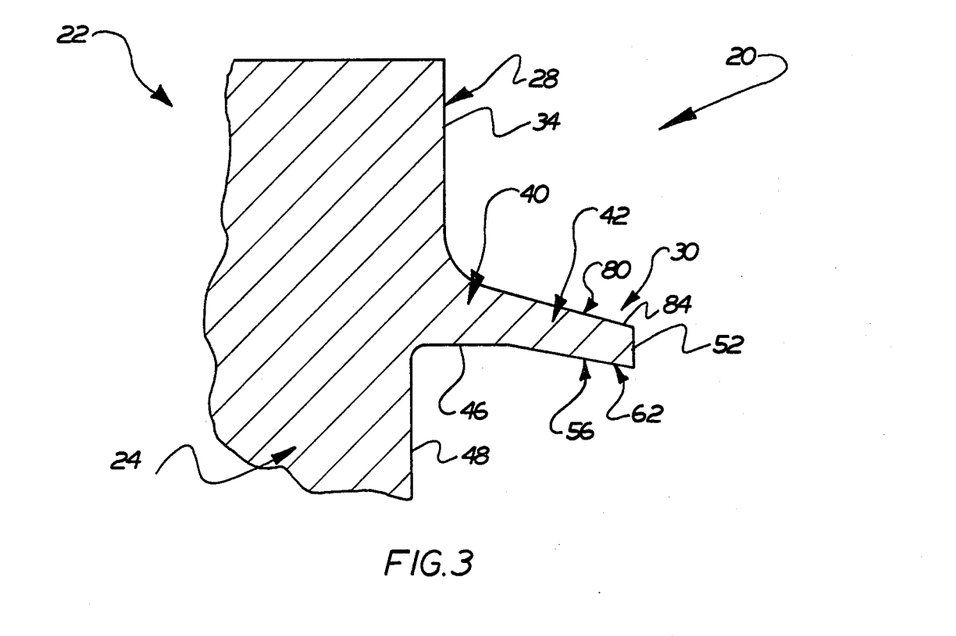
FIG. 3 is a fragmentary sectional view illustrating the relationship between a flat annular bottom surface of a bearing section and a trough portion of an undulating spring section of the bolt of FIGS. 1 and 2.
Figure 4:
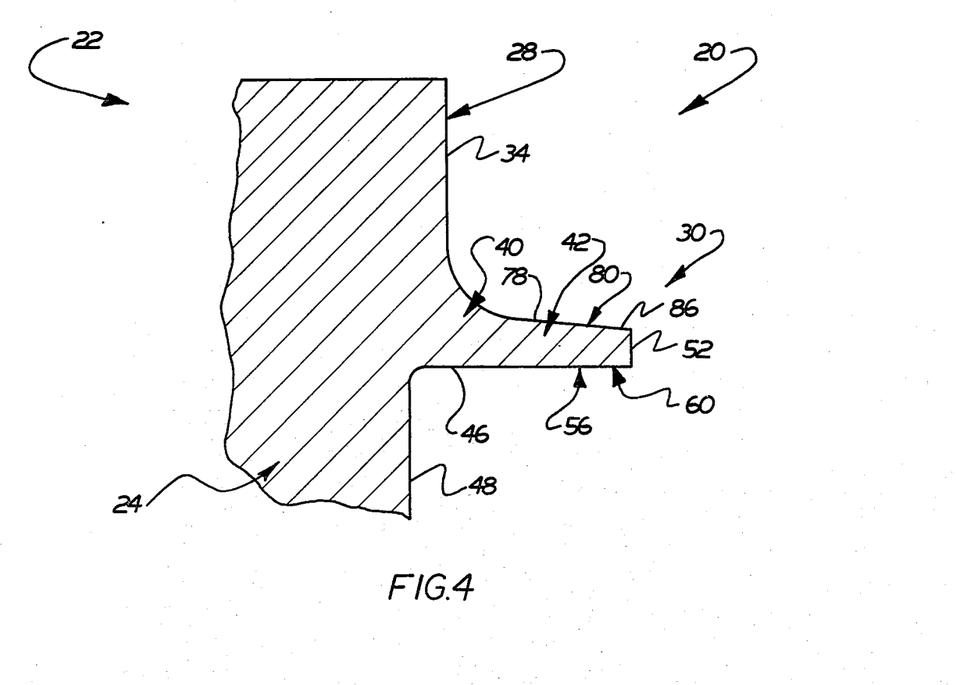
FIG. 4 is a fragmentary sectional view, generally similar to FIG. 3, illustrating the relationship between the flat bottom surface of the bearing section and a crest portion of the undulating spring section.

The bearing section 40c has a flat annular bottom surface (not shown) of a size and shape which is generally similar to the flat annular bottom surface 46 of the bearing section 40 (see FIGS. 3 and 4). The undulating spring section 42c has a bottom surface 56c with crest portions 60c and trough portions 62c. In addition, the spring section 42c has an upper surface 80c with trough portions 82c and crest portions.

When the internally threaded fastener or nut 20c is fully tightened to a predetermined preload, the undulations in the spring section 42c are flattened so that the bearing surface (not shown but similar to the bearing surface 46 of FIG. 3) and bottom surface 56c abuttingly engage the top surface 72 of the member 70. As the fastener 20c is tightened in place, the flattening of the undulations eliminates the gaps between the top surface 72 of the member 70 and the bottom surface 56c at the crest portions 60c to indicate that a desired preload has been applied to the fastener. If the fastener should become loose over an extended period of time, the space or gap between the crest portions 60c and the upper surface of the member 72 will be reestablished to provide a clear visual indication of loosening of the fastener 20c.

Although the specific configurations of the body or drive sections 28a, 28b and 28c and the load transmitting and indicating sections 30a, 30b and 30c have not been as fully described as have the body section 28 and load indicating section 30 of FIGS. 1-7, it should be understood that they are constructed in the same general manner and cooperate with the member 70 in the same general manner as shown in FIGS. 1-7. The body sections 28, 28a, 28b and 28c could have many different configurations than the illustrated hexagonal configuration. For example, the body sections could have a round or oval configuration. If desired the body sections could be provided with tool receiving slots or sockets or could be free of openings.

It should also be understood that although the nut 20c of FIG. 10 has not been provided with retainer elements to hold it against rotation in a direction tending to loosen the nut, retainer elements similar to the ones shown in FIGS. 8 and 9 could be utilized in association with the nut if desired. Although the radial extending splits 90 and 92 of the embodiment of the invention shown in FIG. 8 are illustrated as being used separately from the teeth 100 of the embodiment of the invention shown in FIG. 9, it is contemplated that radially extending splits, similar to the splits 90 and 92, could be formed at the trough portions 62 of spring section 42 and that the teeth 100 could be provided at the crest portions 60 of the same spring section so that the fastener would be held against rotation in a direction tending to loosen the fastener under the combined influence of both the offset portions of the radially split troughs of the spring section and the axially extending teeth at the crest portions of the spring section.

Figure 11:
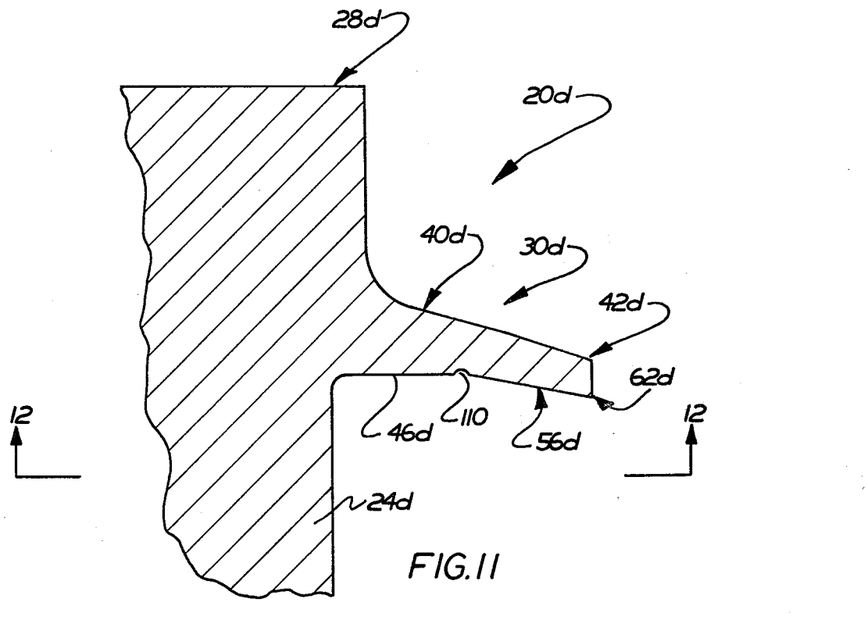
FIG. 11 is a fragmentary sectional view, similar to FIG. 3, of an embodiment of the invention in which the flat annular bottom surface of the bearing section is separated from the spring section by an annular recess.
Figure 12:
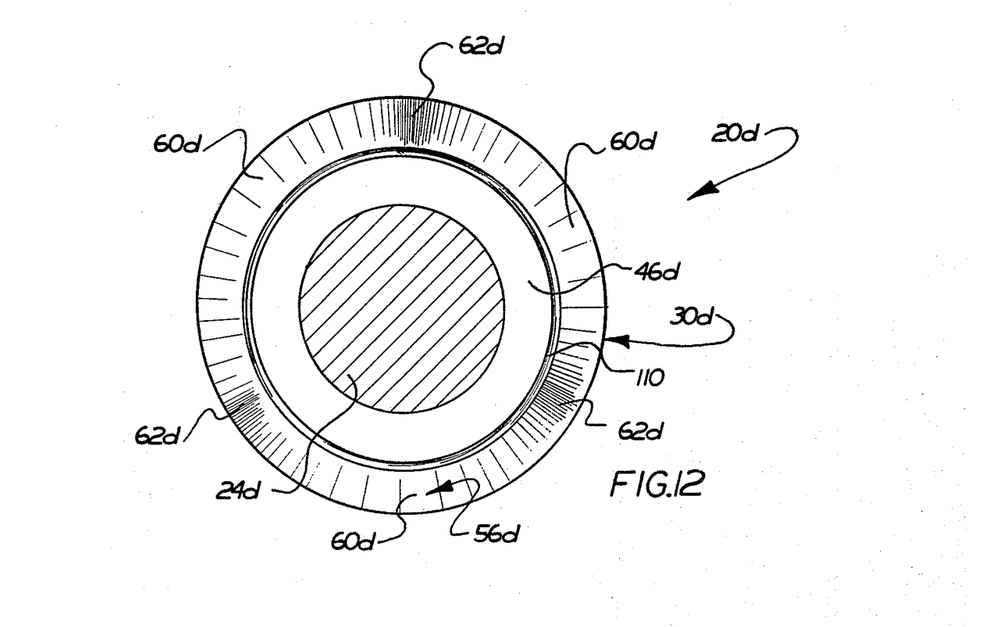
FIG. 12 is a view, taken along the line 12—12 of FIG. 11, further illustrating the construction of this embodiment of the invention.

During fabrication of the fastener 20, difficulty can be encountered in forming the flat annular bearing surface 46 due to a tendency for the bearing surface to deflect during the formation of the undulating rim 52 of the spring section 42. Of course, if the bearing surface 46 is formed with undulations similar to the ones in the spring section 42, the ability of the bearing section to provide an even clamping action throughout its circumferential extent would be impaired. Accordingly, in the embodiment of the invention illustrated in FIGS. 11 and 12, the bearing section 40 is separated from the spring section 42. Since the embodiment of the invention shown in FIGS. 11 and 12 is generally similar to the embodiment of the invention shown in FIGS. 1-7, similar numerals will be utilized to designate similar components, the suffix letter "d" being associated with the numerals of FIGS. 11 and 12 in order to avoid confusion.

A fastener 20d has a body or drive section 28d (FIG. 11) and a load transmitting and indicating section 30d which are disposed in a coaxial relationship with a shank 24d and an external thread convolution (not shown) on the shank. In accordance with a feature of this embodiment of the invention, an annular groove or recess 110 (see FIGS. 11 and 12) is provided between an annular bearing section 40d and an annular spring section 42d. The annular bearing section 40d has a flat annular bottom surface 46d which extends radially outwardly from the cylindrical shank 24d to the circular groove 110 (see FIGS. 11 and 12). The annular spring section 42d has an undulating annular bottom surface 56d which extends radially outwardly from the circular groove 110. The bottom surface 56d has upwardly curving crest portions 60d (FIG. 12) (corresponding to the upwardly curving crest portion 60 of FIG. 2) and downwardly curving trough portions 62d (corresponding to the downwardly curving trough portions 62 of FIG. 2).

Since the annular groove or recess 110 separates the spring section 42d from the bearing section 40d, the undulations in the spring section 42d can be easily stopped or discontinued at the groove 110. Although it is possible to form the bearing section 40d with a flat annular bottom surface 46d in the absence of the annular groove 110, the presence of the groove greatly facilitates keeping the undulations in the spring section 42d separate from the bearing section 40d. Therefore the surface 46d is easily made flat to provide a firm clamping action throughout its circumferential extent.

In view of the foregoing description, it is apparent that the present invention provides a new and improved load indicating fastener 20 which indicates when a predetermined preload has been applied to the fastener to thereby apply a predetermined force against a member 70. The fastener 20 also indicates when the predetermined force against the member is reduced.

The load indicating fastener 20 includes a drive section 28 which is connected to and disposed in a coaxial relationship with a thread convolution 26. A load transmitting and indicating section 30 is connected to and is disposed in a coaxial relationship with the drive section 28. When a predetermined preload is applied to the fastener, undulations or waves in the load transmitting and indicating section 30 are flattened by the force applied against the member 70. This provides a visual indication that the desired preload has been applied to the fastener 20. If the fastener 20 should subsequently become loose, the flattened undulations expand to provide a readily detected visual indication of loosening of the fastener.

The load transmitting and indicating section 30 of the fastener 20 includes a bearing section 40 having a flat annular bottom surface 46 which abuttingly engages the member 70 to apply a clamping force against the member when the fastener is tightened to the desired preload. In addition, the load transmitting and indicating section 30 includes an undulating spring section 42 which circumscribes and is coaxial with the bearing section 40. The spring section 42 has a bottom surface 56 with crest and trough portions 60 and 62. The crest portions 60 of the spring section 42 extend tangentially to the plane of the flat bottom surface 46 of the bearing section 40. The trough portions 62 slope radially and axially outwardly from the bearing section 40 and are engageable with the member to flatten the undulations in the spring section 42 under the influence of forces applied against the trough portions 62 upon the application of a preload. The spring section 42 is resiliently expandable to increase the amplitude of the trough portions 62 upon a reduction of the force applied to the trough portions by the member 70 to provide a visual indication of loosening of the fastener 20.

Having described specific preferred embodiments of the invention, the following is claimed:

1. A load indicating fastener for indicating when a predetermined preload has been applied to said fastener to thereby apply a force against a member and for indicating when the predetermined force against the member is reduced, said load indicating fastener comprising a thread convolution, a body section connected with said thread convolution, and a load transmitting and indicating section connected with said body section, said load transmitting and indicating section including a bearing section having a flat annular bottom surface which extends perpendicular to a central axis of said thread convolution, is adapted to abuttingly engage the member and is disposed in a coaxial relationship with said thread convolution, said body section being disposed on a first axial side of said load transmitting and indicating section and said bottom surface being disposed on a second axial side of said load transmitting and indicating section, said load transmitting and indicating section further including an undulating annular spring section circumscribing said bearing section and disposed in a coaxial relationship with said bearing section and thread convolution, said spring section having undulations which have a first amplitude when said spring section is in an unloaded condition prior to the application of the predetermined preload to said fastener and which are resiliently flattened upon the application of the predetermined preload to said fastener to indicate that the predetermined preload has been applied to said fastener, said spring section being returnable from the flattened condition toward the unloaded condition to increase the amplitude of said undulations upon a reduction in the force applied to the spring section to indicate the reduction in the preload applied to said fastener, said spring section having a circular rim portion which is disposed in a coaxial relationship with said thread convolution and having an undulating bottom surface disposed on the second side of said load transmitting and indicating section, said bottom surface of said spring section having crest portions and trough portions which have amplitudes which increase from zero to a maximum amplitude at the rim portion of said load transmitting and indicating section as the radial distance outwardly from said bearing section increases, said crest portions of said bottom surface of said spring section extending tangentially to the plane of the bottom surface of said bearing section throughout the radial extent of said crest portions, said trough portions sloping radially and axially outwardly from said bearing section in an axial direction away from said body section, said trough portions being engageable with the member, said spring section being resiliently deflectable toward said body section to flatten the undulations in said spring section under the influence of forces applied against said trough portions upon application of the predetermined preload to said body section, said spring section being resiliently returnable to increase the amplitude of said trough portions upon a reduction in the force applied to said trough portions by the member to provide a visual indication of the reduction in force.

2. A load indicating fastener as set forth in claim 1 wherein said spring section has an undulating top surface disposed on the first side of said load transmitting and indicating section, said top surface having crest portions and trough portions which correspond to and are disposed in phase with crest and trough portions of said bottom surface, said crest and trough portions having amplitudes which increase from zero to a maximum amplitude at the rim portion of said load transmitting and indicating section as the radial distance outwardly from said bearing section increases, said crest portions of said top surface of said spring section extending transversely to the plane of the bottom surface of said bearing section throughout the radial extent of said crest portions in said top surface.

3. A load indicating fastener as set forth in claim 1 wherein said body section includes a plurality of flat side surfaces which extend parallel to the central axis of said thread convolution and which are disposed in a hexagonal array, said flat annular bottom surface of said bearing section having an outside diameter which is substantially the same as the diameter of a circle which circumscribes the hexagonal array of side surfaces and which intersects the corners of the hexagonal array of side surfaces.

4. A load indicating fastener as set forth in claim 3 wherein each of said crest portions of said undulations in said bottom surface of said bearing section has a longitudinal central axis which is disposed in a plane containing the central axis of said thread convolution and extending perpendicular to a flat side surface of said body section, each of said trough portions of said undulations in said bottom surface of said bearing section having a longitudinal central axis which is disposed in a plane containing the central axis of said thread convolution and extending perpendicular to a flat side surface of said body section.

5. A load indicating fastener as set forth in claim 1 wherein said rim portion of said spring section has an outside diameter which is from 2.5 to 3.4 times the nominal diameter of said thread convolution.

6. A load indicating fastener as set forth in claim 1 wherein a plane extending tangentially to a radially outermost end of a trough portion and perpendicular to a longitudinal central axis of said thread convolution is spaced from the plane of the bottom surface of said bearing section by a distance which is measured along a line extending parallel to a central axis of said thread convolution and which is equal to between 0.5 and 1.5 times the thickness of said rim portion of said spring section.

7. A load indicating fastener as set forth in claim 1 wherein said flat annular bottom surface of said bearing section has an outside diameter which is between 1.3 and 2.0 times the nominal diameter of said thread convolution.

8. A load indicating fastener as set forth in claim 1 wherein said spring section is split from the rim portion of said spring section to said bearing section, said split extending from a radially outer end of one of said trough portions to the radially outermost side of said bearing section.

9. A load indicating fastener as set forth in claim 8 wherein a portion of said spring section on one side of said split is axially offset from a portion of said spring section on the outer side of said split.

10. A load indicating fastener as set forth in claim 1 wherein said spring section includes retainer means for enabling relative rotation to occur between said fastener and the member in one direction and for retarding relative rotation between said fastener and the member in a direction opposite to the one direction.

11. A fastener as set forth in claim 10 wherein said retainer means is disposed on one of the crest portions of said spring section.

12. A fastener as set forth in claim 10 wherein said retainer means is disposed on one of the trough portions of said spring section.

13. A fastener as set forth in claim 10 wherein said retainer means moves into engagement with the member upon deflection of said spring section from the unloaded condition to the flattened condition.

14. A load indicating fastener as set forth in claim 1 and further including a shank section extending axially outwardly from said body section, said thread convolution being disposed on said shank section, said rim portion of said spring section having an outside diameter which is from 2.5 to 3.4 times the diameter of said shank section.

15. A load indicating fastener as set forth in claim 1 and further including a shank section extending axially outwardly from said body section, said thread convolution being disposed on said shank section, said flat annular bottom surface of said bearing section having an outside diameter which is between 1.3 and 2.0 times the diameter of said shank section.

16. A fastener as set forth in claim 1 wherein said body section includes surface means for defining an opening which extends through said body section, said thread convolution being disposed in said opening and being defined by said surface means.

17. A load indicating fastener as set forth in claim 1 wherein an annular groove is formed in said load transmitting and indicating section between said flat annular surface of said bearing section and said annular spring section.

18. A load indicating fastener for indicating when a predetermined preload has been applied to said fastener to thereby apply a force against a member and for indicating when the predetermined force against the member is reduced, said load indicating fastener comprising a thread convolution, a body section connected with said thread convolution, and a load transmitting and indicating section connected with said body section, said load transmitting and indicating section including a bearing section having a flat annular bottom surface which extends perpendicular to a central axis of said thread convolution, is adapted to abuttingly engage the member and is disposed in a coaxial relationship with said thread convolution, said body section being disposed on a first axial side of said load transmitting and indicating section and said bottom surface being disposed on a second axial side of said load transmitting and indicating section, said load transmitting and indicating section further including an undulating annular spring section circumscribing said bearing section and disposed in a coaxial relationship with said bearing section and thread convolution and surface means for defining an annular groove which separates said bearing section from said spring section, said spring section having undulations which have a first amplitude when said spring section is in an unloaded condition prior to the application of the predetermined preload to said fastener and which are resiliently flattened upon the application of the predetermined preload to said fastener to indicate that the predetermined preload has been applied to said fastener, said spring section being returnable from the flattened condition toward the unloaded condition to increase the amplitude of said undulations upon a reduction in the force applied to the spring section to indicate the reduction in the preload applied to said fastener, said spring section having a circular rim portion which is disposed in a coaxial relationship with said thread convolution and having an undulating bottom surface disposed on the second side of said load transmitting and indicating section, said bottom surface of said spring section having crest portions and trough portions which have amplitudes which increase from zero at the annular groove to a maximum amplitude at the rim portion of said load transmitting and indicating section as the radial distance outwardly from said groove increases, said trough portions sloping radially and axially outwardly from said annular groove in an axial direction away from said body section, said trough portions being engageable with the member, said spring section being resiliently deflectable toward said body section to flatten the undulations in said spring section under the influence of forces applied against said trough portions upon application of the predetermined preload to said body section, said spring section being resiliently returnable to increase the amplitude of said trough portions upon a reduction in the force applied to said trough portions by the member to provide a visual indication of the reduction in force, said bearing section having a circular outer edge portion which extends to a circular inner edge portion of said annular groove, said spring section having a circular inner edge portion which is extends to a circular outer edge portion of said annular groove.

19. A load indicating fastener as set forth in claim 18 wherein said body section includes a plurality of flat side surfaces which extend parallel to the central axis of said thread convolution and which are disposed in a hexagonal array, said flat annular bottom surface of said bearing section having an outside diameter which is substantially the same as the diameter of a circle which circumscribes the hexagonal array of side surfaces and which intersects the corners of the hexagonal array of side surfaces.

20. A load indicating fastener as set forth in claim 19 wherein each of said crest portions of said undulations in said bottom surface of said spring section has a longitudinal central axis which is disposed in a plane containing the central axis of said thread convolution and extending perpendicular to a flat side surface of said body section, each of said trough portions of said undulations in said bottom surface of said bearing section having a longitudinal central axis which is disposed in a plane containing the central axis of said thread convolution and extending perpendicular to a flat side surface of said body section.

21. A load indicating fastener as set forth in claim 18 wherein said crest portions of said bottom surface of said spring section extend tangentially to the plane of the bottom surface of said bearing section throughout the radial extent of said crest portions.

* * * * *